US012711604B2

(12) United States Patent
Hong et al.

(10) Patent No.: US 12,711,604 B2
(45) Date of Patent: Aug. 18, 2026

(54) METHOD FOR DETECTING DEFECTS ON WAFERS, SYSTEM FOR DETECTING DEFECTS ON WAFERS

(71) Applicant: United Semiconductor (Xiamen) Co., Ltd., Xiamen (CN)

(72) Inventors: Yu Peng Hong, Shamen City (CN); Qingrong Chen, Xiamen (CN); Kai Ping Huang, Singapore (SG); Chin-Chun Huang, Hsinchu County (TW); Wen Yi Tan, Xiamen (CN)

(73) Assignee: United Semiconductor (Xiamen) Co., Ltd., Xiamen (CN)

( * ) Notice: Subject to any disclaimer, the term of this patent is extended or adjusted under 35 U.S.C. 154(b) by 559 days.

(21) Appl. No.: 17/988,785

(22) Filed: Nov. 17, 2022

(65) Prior Publication Data

US 2024/0112323 A1 Apr. 4, 2024

(30) Foreign Application Priority Data

Sep. 30, 2022 (CN) ......................... 202211210554.5

(51) Int. Cl.
*G06T 7/00* (2017.01)
*G01N 21/95* (2006.01)

(52) U.S. Cl.
CPC ......... *G06T 7/001* (2013.01); *G01N 21/9501* (2013.01); *G06T 7/0006* (2013.01); *G06T 2207/10061* (2013.01); *G06T 2207/30148* (2013.01)

(58) Field of Classification Search
CPC .................. G06T 7/001; G06T 7/0006; G06T 2207/10061; G06T 2207/30148; G01N 21/9501
See application file for complete search history.

(56) References Cited

U.S. PATENT DOCUMENTS

| | | | | |
|---|---|---|---|---|
| 7,738,119 | B2 | 6/2010 | Tsuru | |
| 8,831,334 | B2 * | 9/2014 | Luo | G06T 7/0004 382/173 |
| 10,733,723 | B2 * | 8/2020 | Diao | G06T 7/10 |
| 2017/0140516 | A1 * | 5/2017 | Maher | G06V 10/758 |
| 2021/0096086 | A1 | 4/2021 | Tang | |
| 2022/0067898 | A1 * | 3/2022 | Chen | G06T 7/001 |
| 2022/0301177 | A1 | 9/2022 | Amer | |
| 2022/0309634 | A1 * | 9/2022 | Atwood | G06V 10/82 |

FOREIGN PATENT DOCUMENTS

| | | |
|---|---|---|
| CN | 101236914 A | 8/2008 |
| CN | 105574500 A | 5/2016 |

* cited by examiner

*Primary Examiner* — Gregory A Morse
*Assistant Examiner* — Rohan Tejas Mukundhan
(74) *Attorney, Agent, or Firm* — Winston Hsu

(57) ABSTRACT

A method for detecting defects on a wafer including the steps of obtaining a reference image of a chip pattern formed on a reference wafer, using a computer algorithm to analyze the reference image to produce a division map for the chip pattern; setting respective thresholds for divisions of the division map, obtaining a comparison data between a test image of the chip pattern formed on a test wafer and the reference image, using the division map and the thresholds to examine the comparison data to identify a defect in the test image.

11 Claims, 8 Drawing Sheets

FIG. 4

METHOD FOR DETECTING DEFECTS ON WAFERS, SYSTEM FOR DETECTING DEFECTS ON WAFERS

BACKGROUND OF THE INVENTION

1. Field of the Invention

The present invention relates to the field of semiconductor manufacturing. More specifically, the present invention relates to a method for detecting defects on a wafer.

2. Description of the Prior Art

In semiconductor manufacturing, defect inspection steps are usually inserted at different fabrication stages to monitor process and provide timely feedback of inline problems for process control, thereby saving subsequent wafers from the same issue and also avoiding the waste resulting from continuing the process of the defective wafers.

Image analysis and comparison is one of the conventional methods to detect defects in the field, which identifies a point in an image as a defect when an image parameter (such as grayscale) of that point exceeds a pre-determined threshold. How to set a proper threshold may have great influence on the sensitivity of defect inspection. An improperly high threshold may reduce the sensitivity and not able to effectively identify defects. An improperly low threshold may fail to discriminate between real defects and misjudgment noise. Therefore, there is still a need in the field to provide a defect detection method with improved inspection accuracy.

SUMMARY OF THE INVENTION

The present invention is directed to provide a method for detecting defects on a wafer and a system for detecting defects on a wafer, which may provide a more accurate inspection result.

According to an embodiment of the present invention, a method for detecting defects on a wafer is disclosed. The method includes the steps of obtaining a reference image of a chip pattern formed on a reference wafer, using a computer algorithm to analyze the reference image to produce a division map for the chip pattern, wherein the division map comprises a plurality of divisions, setting respective thresholds for the divisions, obtaining a comparison data between a test image of the chip pattern formed on a test wafer and the reference image, and using the division map and the thresholds of the divisions to examine the comparison data to identify a defect in the test image.

According to another embodiment of the present invention, a system for detecting defects on a wafer is disclosed. The system includes an inspection tool and a computer. The inspection tool is configured to obtain a reference image and a test image of a chip pattern. The computer is configured to analyze the reference image to produce a division map for the chip pattern, set respective thresholds for the divisions, calculate differences between the reference image and the test image, and examine the differences between the reference image and the test image based on the division map and the thresholds of the divisions to identify a defect in the test image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a flow chart showing the steps of a method for inspecting a wafer according to an embodiment of the present invention.

DETAILED DESCRIPTION

In order to make the objects, features and advantages of the present invention more obvious and understandable, the preferred embodiments are described in detail below together with the attached drawings. The attached drawings are schematic and are not drawn to scale, and the same or similar features are usually described using the same symbols. The embodiments and accompanying drawings described herein are for reference and illustration purposes only and are not intended to limit the present invention. The scope of the present invention is defined by the appended claims, along with the full scope of equivalents to which such claims are entitled.

Figure 1:
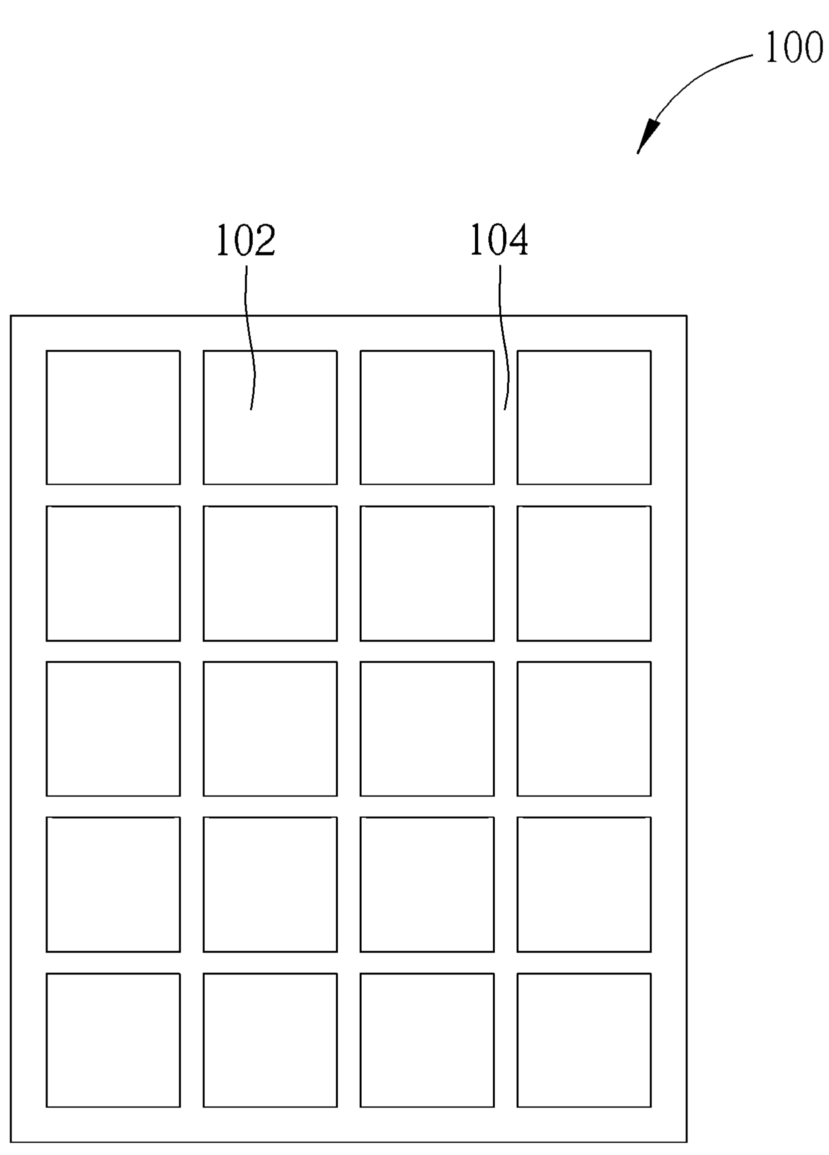
FIG. 1 is a schematic plane view of a layout data for a semiconductor chip according to an embodiment of the present invention.

Please refer to FIG. 1, which is a schematic plane view of a layout data 100 for a semiconductor chip according to an embodiment of the present invention. The layout data 100 may include multiple chip regions 102 and a scribe line region 104 disposed between and separating the chip regions 102. The chip regions 102 are the regions for forming the semiconductor chips and may be singulated into individual dies of the semiconductor chip after the manufacturing process is complete. The scribe line region 104 may include patterns for inline process control and off-line electrical analysis, such as alignment marks, measuring structures, and testkeys. The scribe line region 104 is also the wafer sawing region for singulating the chip regions 102. The layout data 100 may include multiple design pattern layers (for example, an active region layer, a gate layer, a plurality of implanted region layers, and a plurality of interconnection layers, but are not limited thereto) that would be respectively transferred to a photomask (such as the mask 203 shown in FIG. 2) used in manufacturing process to pattern the material layers on a wafer.

Figure 2:
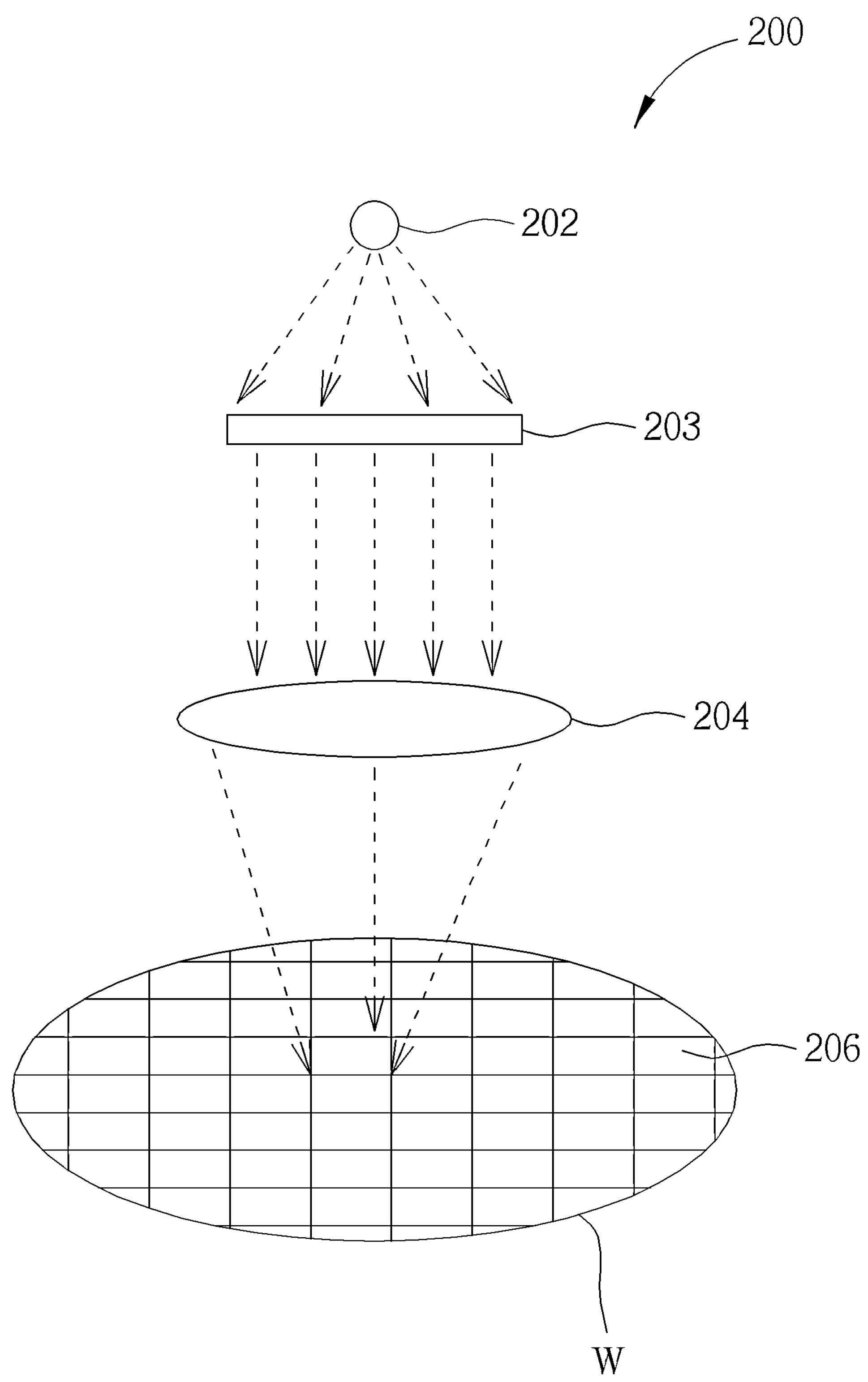
FIG. 2 is a schematic diagram illustrating a photolithography system according to an embodiment of the present invention.

Please refer to FIG. 2, which is a schematic diagram illustrating a photolithography system 200 according to an embodiment of the present invention. The photolithography system 200 is used to transfer the design patterns from the mask 203 to the wafer W. As shown in FIG. 2, the photolithography system 200 may be a stepper or a scanner, but is not limited thereto. The mask 203 may also be referred to as a photomask or a reticle, and may be a binary photomask, a phase shift photomask (PSM), or other suitable types of photomasks. Lights with a proper wavelength emitted from the light source 202 of the photolithography system 200 is directed through the mask 203 and the lens 204 to expose portions of a photoresist layer (not shown) on the wafer W, thereby changing the properties of the exposed portions of the photoresist layer. Subsequently, a development process is performed to selectively remove the exposed portions or the non-exposed portions of the photoresist layer (depending on whether the photoresist layer is positive type or negative type), thereby transferring the design patterns of the mask 203 to the photoresist layer remained on the wafer W. In some embodiments of the present invention, the photoresist layer may be used as an implantation mask to define the implanted regions of the wafer W. In some embodiments of the present invention, the photoresist layer may be used an etching mask to define the regions of the wafer W to be etched, thereby forming the design patterns on the wafer W.

By performing the patterning process as illustrated above and other semiconductor manufacturing processes (such as film deposition, etching, polishing, and ion implantation) multiple times, the integrated circuit structure of the semiconductor chip may be constructed layer by layer on the wafer W. It is noteworthy that, during the manufacturing process, defect inspection steps may be inserted at different fabrication stages to monitor process and provide timely feedback of inline problems for process control, such that subsequent wafers may be saved from the same problems, and wastes caused by continuing the process of the defective wafers may be avoided. In the following description, a system and a method for detecting defects on a wafer are provided, which may not only detect the defects more accurately to provide a timely and valid defect data of the wafer, but also able to reduce manual burden in setting inspection recipe and reviewing false inspection result.

Figure 3:
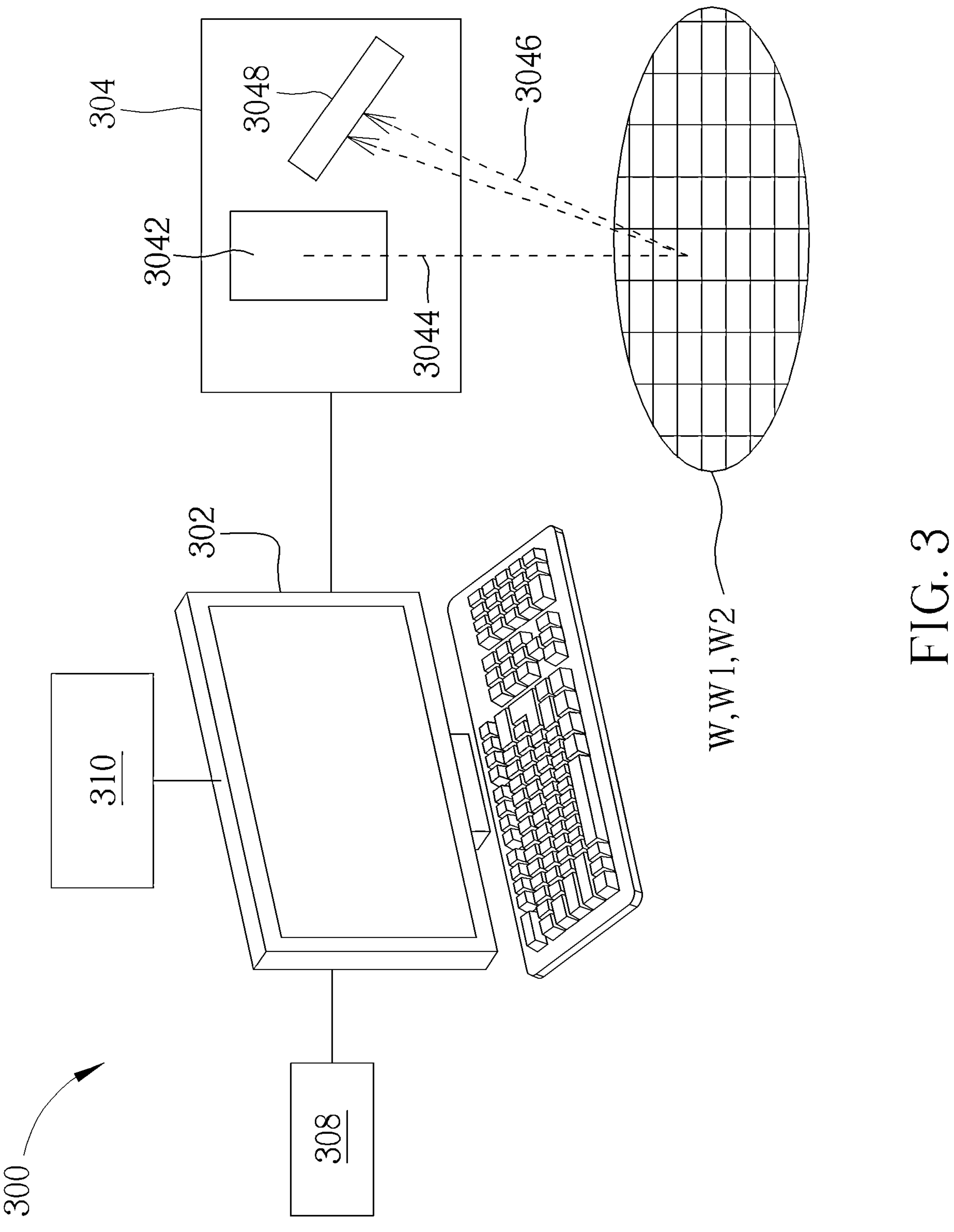
FIG. 3 is a schematic diagram illustrating a system for inspecting a wafer according to an embodiment of the present invention.

Please refer to FIG. 3, which is a schematic diagram illustrating a system 300 for inspecting a wafer according to an embodiment of the present invention. The system 300 may be a stand-alone inspection system, or may be integrated into any processing equipment for manufacturing the semiconductor chip. As shown in FIG. 3, the system 300 may include a computer 302 that may communicate with the inspection tool 304, the memory 310, and the user interface 308 through any suitable communication interface, such as wire cables, wireless communications, direct communications, or local area networks, but are not limited thereto. The inspection tool 304 is configured to receive commands from the computer 302 and obtain an inline image of the wafer W (such as a reference image or a test image) according to the commands. The inspection tool 304 may include any suitable imaging devices. According to an embodiment of the present invention, the inspection tool 304 may include an optical imaging device, which includes a light source 3042 configured to emit a light 3044 to an inspection region of the wafer W, and a light sensor 3048 configured to detect the reflected light signal 3046 reflected from the wafer W. The computer device 302 is also configured to process the reflected light signal 3046 and output the signal as an inline image of the inspection region at the present fabrication stage. The computer device 302 is further configured to analyzing the inline image to produce a division map, setting respective thresholds for the divisions of the division map, calculating the differences between different inline images to obtain a comparison data, and using the division map and the thresholds of the divisions to examine the comparison data to identify a defect in one of the inline images. The memory 310 is configured to store the inline images output from the computer 302 and the division map produced from the inline images.

Figure 4:
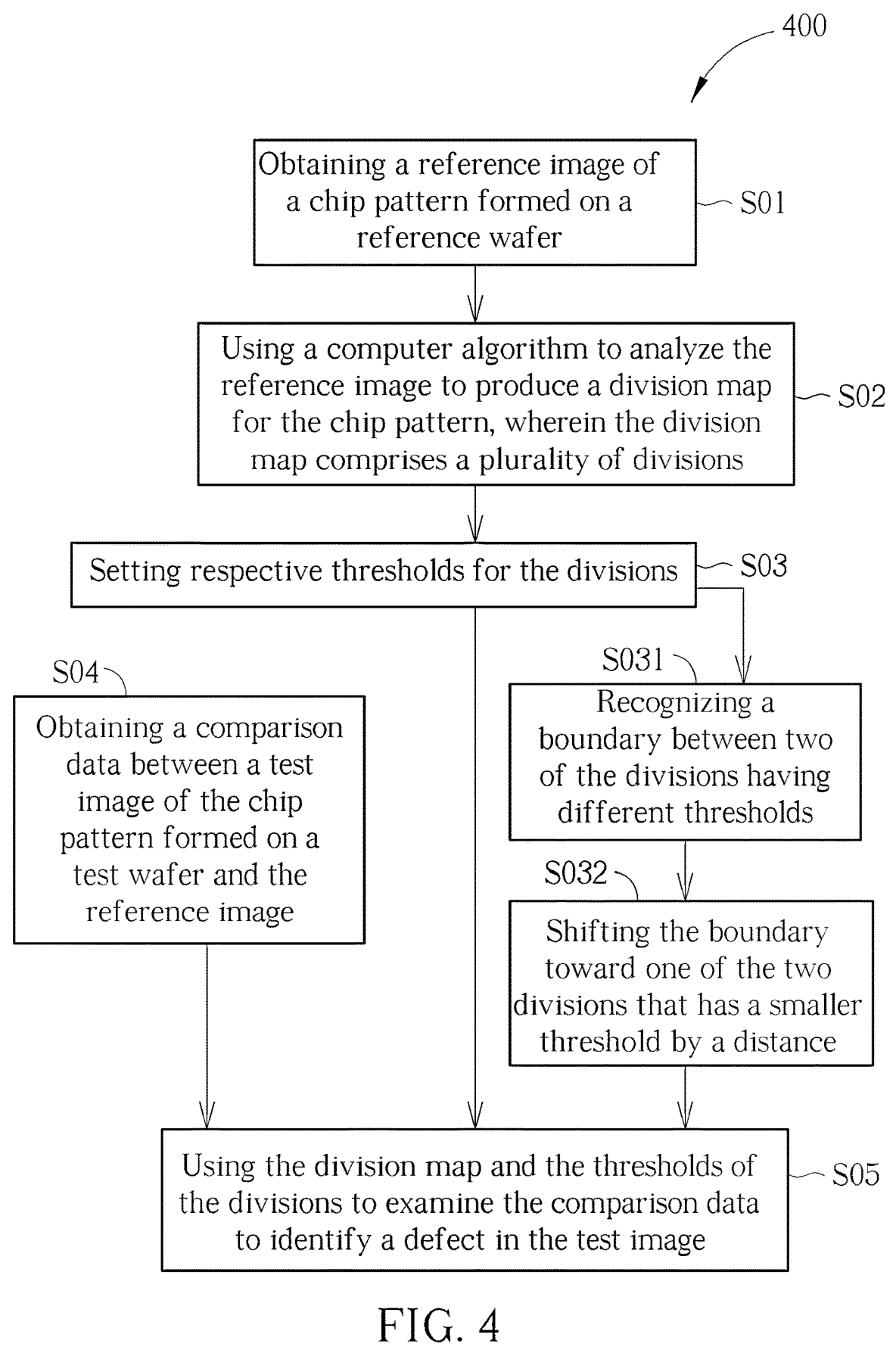
Figure 5:
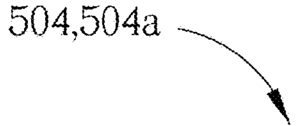
FIG. 5 is a schematic diagram showing a reference wafer and a reference image of a chip pattern obtained from the reference wafer.
Figure 5:
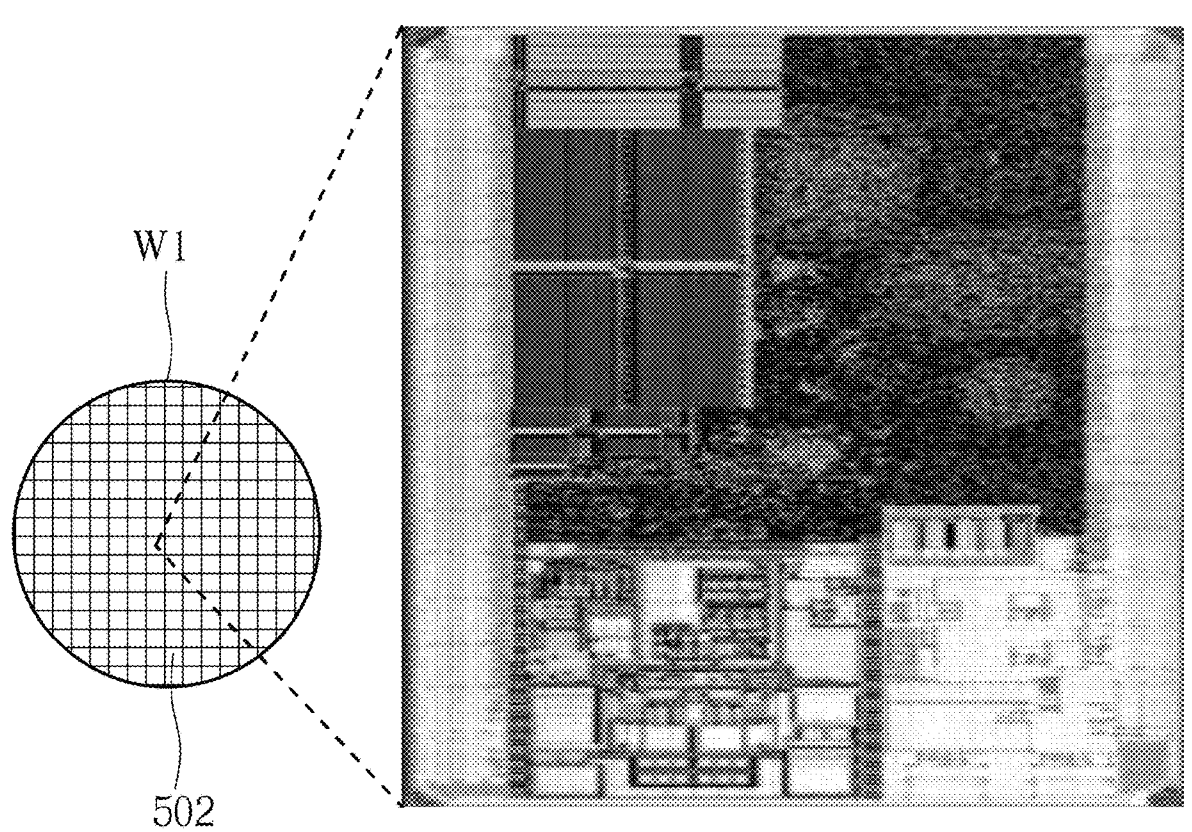
Figure 6:
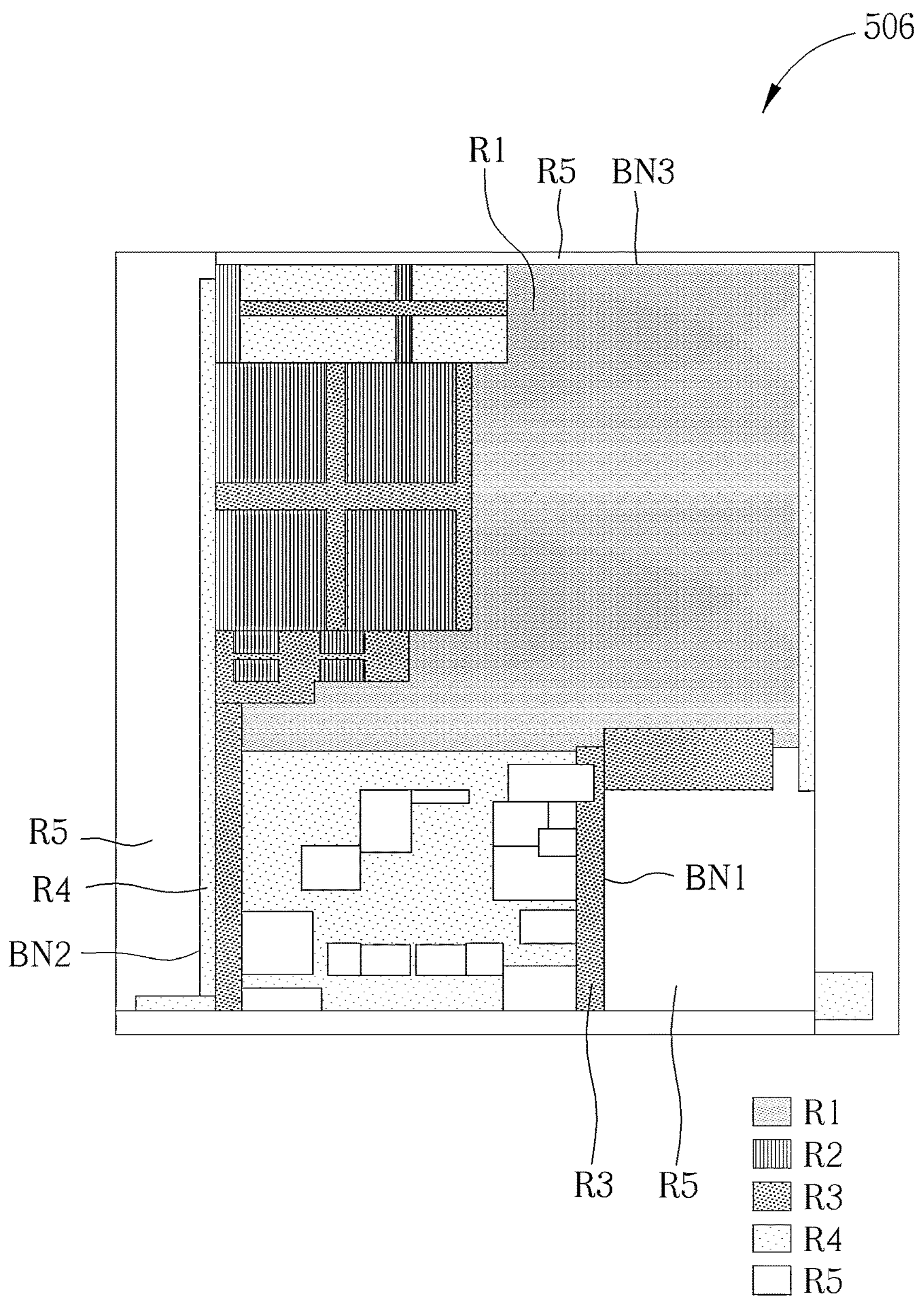
FIG. 6 is a schematic diagram showing a division map obtained by analyzing the reference image in FIG. 5 by a computer algorithm.
Figure 7:
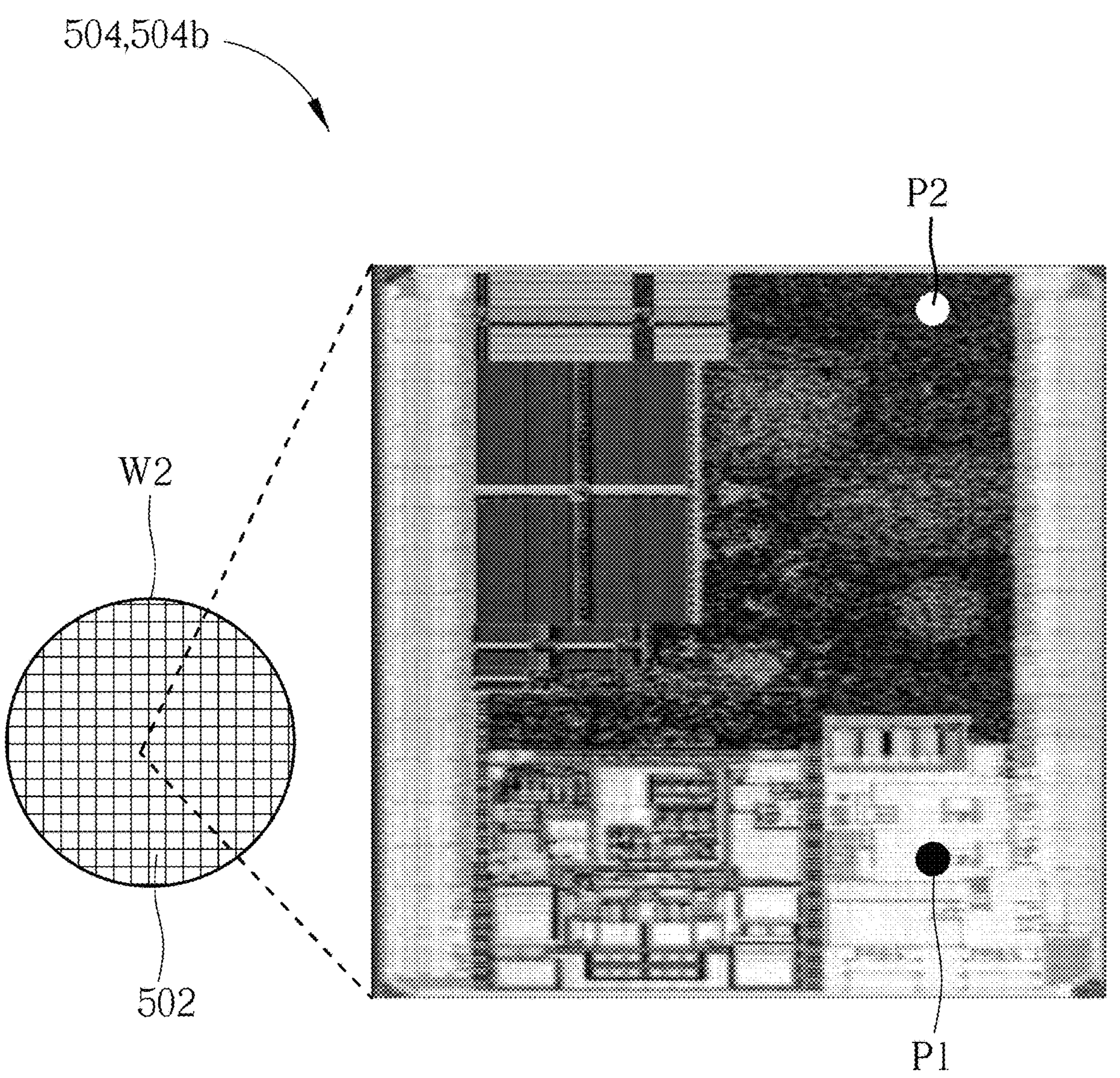
FIG. 7 is a schematic diagram showing a test wafer and a test image of a chip pattern obtained from the test wafer.
Figure 8:
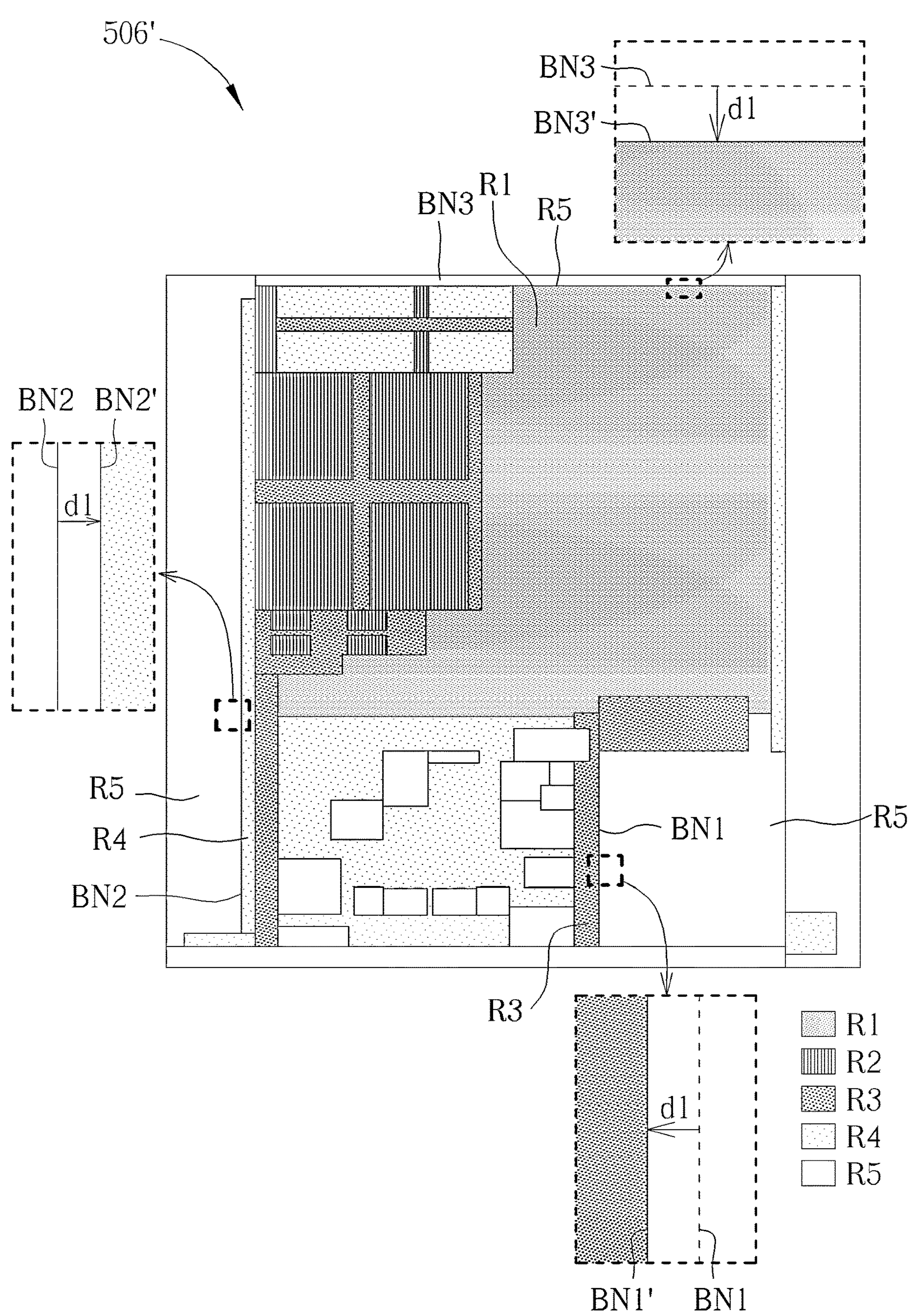
FIG. 8 is a schematic diagram showing a division map obtained by performing boundary adjustment on the division map shown in FIG. 6.

FIG. 4 is a flow chart showing the steps of a method 400 for inspecting a wafer according to an embodiment of the present invention. FIG. 5, FIG. 6, FIG. 7, and FIG. 8 are illustrative examples showing the steps shown in FIG. 4. FIG. 5 illustrates a reference wafer W1 and a reference image 504*a* of a chip pattern 504 obtained from the reference wafer W1. FIG. 6 illustrates a division map 506 obtained by analyzing the reference image 504*a* in FIG. 5 by a computer algorithm. FIG. 7 illustrates a test wafer W2 and a test image 504*b* of the chip pattern 504 obtained from the test wafer W2. FIG. 8 illustrates another division map 506' obtained by performing a boundary adjustment on the division map 506 shown in FIG. 6. It should be noted that the numbers and shapes of the divisions (such as R1 to R5) in the division maps 506 and 506' shown in FIG. 6 and FIG. 8 are schematic examples and may be simplified to omit some details. The actual shapes and numbers of the divisions of the division maps 506 and 506' are determined by the computer algorithm. For the sake of simplicity, more detailed divisions are not shown in the drawings. The boundaries of the division may be straight lines or may be bent. The method 400 shown in FIG. 4 may be performed using the system 300 shown in FIG. 3.

Please refer to FIG. 4 and FIG. 5, the first step S01 of the method 400 includes obtaining a reference image 504*a* of a chip pattern 504 from a reference wafer W1. The reference wafer W1 may be a semi-fabricated product wafer. The reference image 504*a* is an inline image of one of the chip regions 502 of the product (the semiconductor chip), showing the chip pattern 504 of the product at the present fabrication stage. According to an embodiment of the present invention, the reference image 504*a* is a grayscale image composed of pixels with grayscale values (or brightness values) respectively between 0 and 255, wherein a pixel of value 0 is a fully black (dark) pixel, a pixel of value 255 is a fully white (bright) pixel, and a pixel of any intermediate value is a shade of black and white. Since pixel grayscale values are influenced by local pattern density, the circuit blocks of the chip pattern 504 appear as the different grayscale blocks at a small magnification of the reference image 504*a*.

Please refer to FIG. 4 and FIG. 6. Following, the method 400 may proceed to step S02, which includes using the computer 302 to perform a computer algorithm to analyze the reference image 504*a* to produce a division map 506 for the chip pattern 504. In some embodiments of the present invention, the computer algorithm includes dividing the full grayscale range (0 to 255) into, for example, 5 to 10 sub-ranges from darker to bright, and performing a boundary extraction algorithm to extract the boundaries between neighboring grayscale blocks in the reference image 504*a*, thereby distinguishing divisions of the division map 506. The divisions of the division map 506 are therefore grouped into different groups according to their respective grayscale levels and the grayscale sub-ranges. In the embodiment shown in FIG. 6, the grayscale range (0 to 255) is divided into 5 sub-ranges, wherein the divisions of the same grayscale group are filled with the same pattern (the filling patterns do not represent the darkness levels of the divisions). The division map 506 produced by computer algorithm analysis includes a plurality of divisions R1 of a first grayscale group, a plurality of divisions R2 of a second gray scale group, a plurality of divisions R3 of a third grayscale group, a plurality of divisions R4 of a fourth grayscale group, and a plurality of divisions R5 of a fifth grayscale group. In other embodiments, the grayscale range (0 to 255) may be divided into more sub-ranges to produce a more detailed division map 506.

Please continue to refer to FIG. 4 and FIG. 6. Following, the method 400 may proceed to step S03, which includes setting respective thresholds for the divisions. In some embodiments of the present invention, the thresholds are grayscale differences, and the threshold of a darker region may be smaller than the threshold of a brighter region, wherein a smaller threshold means a smaller tolerance for grayscale difference. For example, the threshold of the divisions R1 of the darkest grayscale level may be T1, the threshold of the divisions R2 of the second darkest grayscale level may be T2, the threshold of the divisions R3 of the third darkest grayscale level may be T3, the threshold of the divisions R4 of the second brightest grayscale level may be T4, and the threshold of the divisions R5 of the brightest grayscale level may be T5, wherein T5>T4>T3>T2>T1.

Please refer to FIG. 4 and FIG. 7. Subsequently, the method 400 may proceed to step S04, which includes obtaining a test image 504*b* of the chip pattern 504 from a test wafer W2, and analyzing the test image 504*b* and the reference image 504*a* to obtain their comparison data. The test wafer W2 is also a semi-fabricated wafer of the same product as the reference wafer W1. The teat image 504*b* is an inline pattern of one of the chip regions 502 on the test wafer W1 obtained by the system 300 as shown in FIG. 3. In some embodiments of the present invention, the test image 504*b* and the reference image 504*a* are inline images at the same fabrication stage of the product, and are both grayscale images including similar grayscale blocks.

Following, as shown in FIG. 4, the method 400 may proceed to step S05, which includes using the division map 506 and the thresholds of the divisions as illustrated in step S02 and step S03 to examine the comparison data to identify a defect in the test image W2. For example, as shown in FIG. 7, the dark point P1 shown in the lower right portion of the test image 504*b* is located correspondingly in the division R5 in the lower right portion of the division map 506. After calculating the grayscale difference between the dark point P1 and the point at the same coordinate in the reference image 504*a*, the grayscale difference is examined by the threshold T5 of the division R5. If the grayscale difference exceeds the threshold T5, the dark point P1 is judged as a defect. Similarly, the bright point P2 shown in the upper right portion of the test image 504*b* is located correspondingly in the division R1 in the upper right portion of the division map 506. After calculating the grayscale difference between the bright point P2 and the point at the same coordinate in the reference image 504*a*, the grayscale difference is examined by the threshold T1 of the division R1. If the grayscale difference exceeds the threshold T1, the bright point P2 is judged as a defect. The present invention is featured in that the thresholds of the divisions are set according to their respective grayscale levels, which may improve inspection sensitivity for defects formed in darker regions and also reduce the noise caused by misjudgment in the brighter regions.

In some embodiments of the present invention, the boundaries of the divisions of the division map 506 may be adjusted to reduce the misjudgment noise. As shown in FIG. 4, the method 400 may optionally include step S031, which includes recognizing the boundary between neighboring two of the divisions having different thresholds. Following, step S032 is performed, which includes shifting the boundary toward the division having the smaller threshold by a distance. For example, as shown in FIG. 6 and FIG. 8, after the boundary extraction algorithm, the computer 302 may recognize the boundary BN1 between the division R1 and the division R5, the boundary BN2 between the division R4 and the division R5, and the boundary BN3 between the division R1 and the division R5. Subsequently, using the computer 302, the boundary BN1 is shifted toward the division R3 by a distance d1 to become the boundary BN1'. The boundary BN2 is shifted toward the division R4 by the distance d1 to become the boundary BN2'. The boundary BN3 is shifted toward the division R1 by the distance d1 to become the boundary BN3'. In some embodiments, the distance d1 may be approximately 0.3 um. Accordingly, an adjusted division map 506' may be obtained. Using the adjusted division map 506' in step S05 to examine the comparison data may reduce the misjudgment noise on the boundaries.

In conclusion, the method provided by present invention utilizes a computer algorithm to analyze the reference image to automatically produce a division map and set respective thresholds for the divisions which are used to examine the presence of defects in a test image. In comparison with conventional method which uses a single threshold to examine the entire test image, the method of the present invention may detect the defects in each of the divisions more accurately. Furthermore, since the division map is produced automatically by computer algorithm, the burden in manual map drawing for setting inspection recipe and variations caused by personal subjective judgments may be eliminated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting defects on a wafer, comprising:

obtaining a grayscale reference image of a chip pattern formed on a reference wafer;

using a computer algorithm to analyze the grayscale reference image to produce a division map for the chip pattern, wherein the division map comprises a plurality of divisions;

grouping the divisions according to the grayscale levels of the divisions, wherein the divisions are grouped into 5 to 10 groups;

setting respective grayscale difference thresholds for the groups of the divisions, wherein a grayscale difference threshold of a group of darker divisions is smaller than a grayscale difference threshold of a group of whiter divisions;

obtaining a grayscale difference data between a grayscale test image of the chip pattern formed on a test wafer and the grayscale reference image; and using the division map and the grayscale difference thresholds of the divisions to examine the comparison data to identify a defect in the grayscale test image.

2. The method for detecting defects on a wafer according to claim 1, wherein the comparison data comprises differences in grayscale value between the grayscale test image and the grayscale reference image.

3. The method for detecting defects on a wafer according to claim 1, wherein the grayscale difference thresholds of the divisions of the same group are the same.

4. The method for detecting defects on a wafer according to claim 1, further comprising:

recognizing a boundary between two of the divisions having different grayscale difference thresholds; and shifting the boundary toward one of the two divisions that has a smaller grayscale difference threshold.

5. The method for detecting defects on a wafer according to claim 4, wherein the boundary is shifted by 3 um.

6. The method for detecting defects on a wafer according to claim 1, wherein the grayscale reference image and the grayscale test image are obtained by a same inspection tool.

7. The method for detecting defects on a wafer according to claim 6, wherein the inspection tool is a SEM or an optical imaging tool.

8. A system for detecting defects on a wafer, comprising:

an inspection tool, configured to obtain a grayscale reference image and a grayscale test image of a chip pattern; and a computer, configured to:

analyze the grayscale reference image to produce a division map for the chip pattern, wherein the division map comprises a plurality of divisions;

group the divisions according to the grayscale levels of the divisions, wherein the divisions are grouped into 5 to 10 groups;

set respective grayscale difference thresholds for the groups of the divisions, wherein a grayscale difference threshold of a group of darker divisions is smaller than a grayscale difference threshold of a group of whiter divisions;

calculate differences between the grayscale reference image and the grayscale test image to provide a grayscale difference data; and examine the grayscale difference data based on the division map and the grayscale difference thresholds of the divisions to identify a defect in the grayscale test image.

9. The system for detecting defects on a wafer according to claim 8, wherein the inspection tool is a SEM or an optical imaging tool.

10. The system for detecting defects on a wafer according to claim 8, further comprising a memory configured to store the grayscale reference image, the grayscale test image, and the division map.

11. The system for detecting defects on a wafer according to claim 8, wherein the computer is further configured to:

recognize a boundary between two of the divisions having different grayscale difference thresholds; and shift the boundary toward one of the two divisions that has a smaller grayscale difference threshold.

* * * * *